3,296,280
THE OXIDATION OF TERTIARY-BUTYL GROUPS ATTACHED TO AN AROMATIC RING TO FORM THE CORRESPONDING AROMATIC CARBOXYLIC ACID
Henry J. Peterson, Wilmington, Del., assignor to Sun Oil Company, Philadelphia, Pa., a corporation of New Jersey
No Drawing. Filed July 18, 1963, Ser. No. 296,094
11 Claims. (Cl. 260—346.4)

This invention relates to a method for preparing aromatic carboxylic acids or the anhydrides thereof by the oxidation of the corresponding tertiary-butyl-substituted aromatic compounds.

Theretofore, the oxidation of tertiary-butyl groups attached to an aromatic ring to form the corresponding aromatic carboxylic acid compound has proved to be an extremely difficult, if not impossible reaction to perform. Thus, Contractor et al. (J. Chem. Soc., p. 1314 [1949]) after reviewing several attempts in the field by prior art workers concluded that "The tert.- butyl group is resistant to most oxidizing agents." This was further evidenced by the author's own discovery that both methyl groups on 4-tert.-butyl-$\sigma$-xylene were oxidized by boiling aqueous potassium permanganate to form 4-tert.-butylphthalic acid while the tertiary butyl group remained untouched.

However, quite surprisingly it has now been found, in accordance with the present invention, that tertiary butyl groups attached to an aromatic ring, may very readily be converted to the corresponding aromatic carboxylic acids by oxidizing these aromatic tertiary butyl groups with $NO_2$ gas at elevated temperatures in the presence of a solvent which is substantially inert to $NO_2$. While catalysts such as $SeO_2$ may be employed in this reaction, their presence is not essential for the successful conduct of this novel process.

Compounds which may be employed as starting materials in the present process include those aromatic ring compounds having attached thereto at least one tertiary butyl group, and which may also contain other groups in addition to the tertiary butyl group, whether they be nonoxidizable by this process, such as carboxy, or nitro moities, or whether they be oxidizable, as for example lower alkyl groups other than tertiary butyl, particularly methyl or ethyl, or formyl or hydroxy, chloro groups and the like. Similarly, the correspondingly substituted biphenyl compounds may also be employed as starting materials. Thus, such compounds as tertiary butylbenzene, 4-tertiary butylbenzoic acid, 3-tertiary butyltoluene, 4-tertiary butyl-$\sigma$-xylene, 1,4-di-tertiary butylbenzene, 3-tertiary butylnitrobenzene, 4-tertiary butylchlorobenzene, 4-tertiary butylbenzylbromide, 3-tertiary butylbenzylchloride, 4-tertiary butylbenzyldehyde, 4-tertiary butyl-4-carboxy biphenyl, or 3-tertiary butyl-4-methyl biphenyl, may be employed.

When the foregoing compounds are reacted with $NO_2$ gas in accordance with the present invention, there are obtained the corresponding aromatic carboxylic acids, as for example, benzoic acid, terephthalic acid, nitro-benzoic acid, chlorobenzoic acid, 4,4'-dicarboxybiphenyl and the like.

It should be noted, however, that when two oxidizable groups are adjacent to each other, there is obtained a mixture of the resulting aromatic dicarboxylic acid and its corresponding acid anhydride. This mixture may, if desired, be converted entirely to the anhydride form by removal of the $NO_2$, as for example, by purging the reaction system with nitrogen gas, followed by heating the reaction mixture at reflux temperature for a time sufficient to convert any acid which may be present to its corresponding anhydride.

The process of this invention is conveniently carried out by dissolving the tertiary butyl aromatic starting material in a solvent which is inert to $NO_2$ at elevated temperatures utilized in this reaction and bubbling $NO_2$ through the reaction mixture until the oxidation is complete. It has been found that various chlorinated benzenes are quite suitable as solvents and preferably those having from 1–4 chlorine atoms, particularly trichlorobenzene. However, depending upon the range of reaction conditions, other solvents such as higher or lower chlorinated benzenes, nitro-benzenes, ethers such as diphenylether or chlorinated ethers and the like may also be employed.

A considerable range of temperatures may be used in this reaction. The minimum temperature for operation is about 145° C. and preferably it ranges from about 160°–200° C., although higher temperatures up to the decomposition points of reactants and end products may be employed.

In conducting this reaction, it is desirable that the amount of $NO_2$ employed be as stoichiometric as possible in order to insure substantially complete reduction of the $NO_2$ to NO, thus making the recovery of the NO and reconversion to $NO_2$ a simple and complete operation so that the $NO_2$ is recycled with practically no loss. The regulation of the amount of $NO_2$ thus employed is readily achieved by making certain that the off-gases produced by the reaction are essentially colorless; since brown off-gases will be a clear indication that unconsumed $NO_2$ is passing through. Generally, rates of about 1.5 to 2.5 grams of $NO_2$ per minute are preferred. Alternatively, if necessary, when maximum yields in a one-stage oxidation are desired, the reaction may be continued for a period of time after brown off-gases are noted to insure maximum oxidation of the starting material.

The presence of $SeO_2$, it has been found, affords a somewhat purer product when the starting material contains a methyl group attached to the aromatic nucleus, as for example, with tertiary butyltoluene. The selenium catalyst may be added to the reaction mixture as the dioxide, or as $H_2SeO_3$ dissolved in water; alternatively, it may be prepared in situ in the reaction vessel by bubbling $NO_2$ gas through the solvent in the presence of selenium metal at an elevated temperature, either prior to the addition of the starting material or in small portions at equal intervals during the course of the reaction until the selenium is oxidized to the dioxide.

When the aromatic carboxylic acid reaction products are insoluble in the chlorobenzene solvent, they may readily be recovered by simply filtering and drying the precipitated solids. Thus, for example, in the preparation of an aromatic dicarboxylic acid, this product is readily recovered by filtering the solids, washing them with a suitable organic solvent such as hexane, heptane or the like, and drying the washed solids in an oven. The acid may, if desired, be further purified by known crystallization methods, or alternatively, esterified, as for example with a low molecular weight alcohol such as methanol or ethanol at an elevated temperature to form the corresponding ester or diester. The more soluble reaction products may conveniently be recovered by extracting the reaction mixture with an aqueous solution of base, such as NaOH, separating and recovering the resulting aqueous phase from the organic phase, treating said aqueous phase with a dilute mineral acid, as for example, HCl, and recovering the precipitated acid from solution.

*Example 1*

1200 ml. of trichlorobenzene is heated to 195° C. in a reactor fitted with a gas inlet tube, a side arm with a condenser, a thermometer, and a stirrer. $NO_2$ gas preheated to 160° C. is bubbled through the flask at the rate of about 2 gms./min. A solution of 142 gms. of p-tertiary butylbenzoic acid in 400 ml. of trichlorobenzene is added in 25 ml. portions over a period of 4 hours, the temperature rising to about 209° C., and 24 ml. of water is collected. The reaction mixture is cooled to room temperature, the solids filtered, washed with hexane and dried in an oven to yield 27 gms. of terephthalic acid.

In accordance with the foregoing procedure, but starting with 2-methyl-5-tertiary butyl chlorobenzene, there is obtained the corresponding σ-chloro-terephthalic acid.

Example 2

1000 ml. of trichlorobenzene is heated to 195° C. in a reactor fitted with a gas inlet tube, a side arm with a condenser, a thermometer, and a stirrer. $NO_2$ gas preheated to 160° C. is bubbled through the flask at the rate of about 1.5 gms./min. A solution of 120 gms. of tertiary butylbenzene in 400 ml. of trichlorobenzene is added in 25 ml. portions over a period of 4 hours, the temperature rising to about 209° C., and 21 ml. of water is collected. The reaction mixture is cooled to room temperature, extracted with dilute NaOH, acidified with HCl, and the acids filtered, washed with hexane and dried to yield 16 gms. of benzoic acid.

In accordance with the foregoing procedure, but starting with 3-tertiary butyl benzyl chloride, there is obtained the corresponding isophthalic acid.

Example 3

1250 ml. of trichlorobenzene is heated to 195° C. in a reactor fitted with a gas inlet tube, a side arm with condenser, a thermometer, and a stirrer. $NO_2$ gas preheated to 160° C. is bubbled through the flask at the rate of about 2.0 gms./min. A solution of 135 gms. of 1,4-di-tertiary butylbenzene in 400 ml. of trichlorobenzene is added in 25 ml. portions over a period of 4 hours, the temperature rising to about 209° C. and 52 ml. of water is collected. The reaction mixture is cooled to room temperature, the solids filtered, washed with hexane and dried in an oven to yield 5.3 gms. of terephthalic acid.

In accordance with the foregoing procedure, but starting with 4-tertiary butyl benzaldehyde, there is obtained the corresponding terephthalic acid.

Example 4

1200 ml. of trichlorobenzene is heated to 195° C. in a reactor fitted with a gas inlet tube, a side arm with a condenser, a thermometer, and a stirrer. $NO_2$ gas preheated to 160° C. is bubbled through the flask at the rate of about 2 gms./min. A solution of 140 gms. of 3-tertiary butyl nitrobenzene in 400 ml. of trichlorobenzene is added in 25 ml. portions over a period of 4 hours, the temperature rising to about 209° C. and 20 ml. of water is collected. The reaction mixture is cooled to room temperature, the solids filtered, washed with hexane and dried in an oven to yield 14 gms. of m-nitrobenzoic acid.

In accordance with the foregoing procedure, but starting with 4-tertiary butyl chlorobenzene, there is obtained the corresponding p-chloro-benzoic acid.

Example 5

1200 ml. of trichlorobenzene is heated to 195° C. in a reactor fitted with a gas inlet tube, a side arm with a condenser, a thermometer, and a stirrer. $NO_2$ gas preheated to 160° C. is bubbled through the flask at the rate of about 2 gms./min. A solution of 142 gms. of 4'-tertiary-butyl-4-carboxy biphenyl in 400 ml. of trichlorobenzene is added in 25 ml. portions over a period of 4 hours, the temperature rising to about 209° C. and 16 ml. of water is collected. The reaction mixture is cooled to room temperature, the solids filtered, washed with hexane and dried in an oven to yield 24 gms. of 4,4'-dicarboxy biphenyl.

In accordance with the foregoing procedure, but starting with 3-tertiary butyl-4'-methyl biphenyl, there is obtained the corresponding 3,4'-dicarboxy biphenyl.

Example 6

To a reactor fitted with a gas inlet tube, a side arm with a condenser, a thermometer, and a stirrer, is added 1150 ml. of trichlorobenzene and heated to 195° C., one gram of selenium is added and $NO_2$ preheated to 160° C., is bubbled through the solution at a rate of about 1.7 gms./min. A solution of 137 grams of 3-tertiary butyl-toluene in 400 ml. of trichlorobenzene is added in 25 ml. portions over a period of 4 hours. During this same period 3.5 gms. of additional selenium is added to the reaction, the last of which is added to the end of the fourth hour. The reaction is then continued for an additional hour, the temperature rising to about 215° C. during which time 30 ml. of water collected. The reaction mixture is cooled to room temperature, the solids filtered, washed with benzene, and dried in an oven to yield 23 gms. of isophthalic acid.

Example 7

To a reactor fitted with a gas inlet tube, a side arm with a condenser, a thermometer, and a stirrer, is added 1200 ml. of trichlorobenzene and heated to 195° C. One gram of selenium is added and $NO_2$ preheated to 160° C. is bubbled through the solution at a rate of about 2.2 gms./min. A solution of 145 gms. of 4-tertiaryl butyl-σ-xylene in 400 ml. of trichlorobenzene is added in 25 ml. portions over a period of 4 hours. During this same period 3.5 gms. of additional selenium is added to the reaction, the last of which is added to the end of the fourth hour. The reaction is then continued for an additional hour, the temperature rising to about 215° C., during which time 40 ml. of water collected. The system is purged with nitrogen and heated for one more hour at reflux temperature. The reaction mixture is cooled to room temperature, the solids filtered, washed with benzene, and dried in an oven to yield 21 gms. of trimellitic anhydride.

The invention claimed is:

1. A process for the oxidation of tertiary butyl groups attached to an aromatic ring which comprises reacting said teritary butyl-substituted aromatic compounds with $NO_2$ gas at a temperature in excess of about 160° C. in the presence of a solvent which is substantially inert to $NO_2$ to obtain the corresponding aromatic carboxylic acid.

2. The process according to claim 1 wherein the inert solvent is trichlorobenzene.

3. The process according to claim 1 wherein said aromatic starting material is tertiary butyl benzoic acid.

4. The process according to claim 1 wherein said aromatic starting material is a biphenyl compound.

5. The process according to claim 5 wherein the biphenyl compound is 4-tertiary butyl-4'-carboxybiphenyl.

6. The process according to claim 1 wherein the aromatic ring is free of fused rings and wherein a methyl group is attached to said aromatic ring non-adjacent to said tertiary butyl group and wherein the reaction is carried out in the presence of selenium dioxide catalyst.

7. The process according to claim 6 wherein said starting material is p-tertiarybutyltoluene.

8. The process according to claim 6 wherein said starting material is p-tertiary butyl-σ-xylene.

9. The process for the production of a carboxylic acid anhydride derivative of an aromatic compound which comprises reacting a tertiary-butyl-substituted aromatic compound with $NO_2$ gas at elevated temperatures in the presence of a solvent which is substantially inert to $NO_2$, said tertiary-butyl-substituted aromatic compound having attached to the ring in a position adjacent to said tertiary butyl group, a group which is oxidizable by $NO_2$, thereafter removing the $NO_2$, heating the reaction mixture, and recovering the corresponding acid anhydride.

10. The process according to claim 9 wherein the group adjacent to the tertiary-butyl group is a methyl group.

11. The process according to claim 9 wherein two tertiary butyl groups are adjacent to each other.

References Cited by the Examiner
UNITED STATES PATENTS

| | | | |
|---|---|---|---|
| 2,415,800 | 2/1947 | Rust et al. | 260—524 |
| 2,839,575 | 6/1958 | Fetterly | 260—524 |
| 2,867,674 | 2/1959 | Patinkin et al. | 260—524 X |

FOREIGN PATENTS

| | | |
|---|---|---|
| 1,282,785 | 12/1961 | France. |
| 823,437 | 11/1959 | Great Britain. |

OTHER REFERENCES

Karrer, P., "Organic Chemistry" (1950), page 529.

RICHARD K. JACKSON, *Primary Examiner.*

LORRAINE A. WEINBERGER, *Examiner.*

S. B. WILLIAMS, *Assistant Examiner.*